UNITED STATES PATENT OFFICE.

JOSEPH SILVER, OF NEW YORK, N. Y.

ALUMINUM-SOLDER.

968,203.

Specification of Letters Patent. Patented Aug. 23, 1910.

No Drawing. Application filed November 9, 1909. Serial No. 527,100.

*To all whom it may concern:*

Be it known that I, JOSEPH SILVER, a citizen of the Kingdom of Hungary, and a resident of New York, in the county and State of New York, have invented certain new and useful Improvements in Aluminum-Solder, of which the following is a specification.

This invention has reference to novel aluminum solder and the process of producing same.

It is the special object of my invention to produce a novel alloy for soldering aluminum parts which is easily prepared and applied and gives best and uniform results.

In addition to these main objects it has been sought to keep the cost of production low so as to make the novel solder a general commodity. This has been primarily attained by the use of a simple process of producing same and the careful selection of the materials of which the solder is composed. In order to obtain the solder free from impurities it is prepared in vessels which will not impart undesirable and detrimental substances thereto during the process of manufacture. The utensils employed in making the solder likewise keep it free from impurities and the casting of the solder bars or rods is carried out in such manner that the same remain pure.

In carrying the present invention into effect I substantially proceed as follows: First a graphite crucible is carefully heated from below so that the flame does not touch the top opening of same. Now aluminum is placed into the crucible and the heat raised to about 650° C., then magnesium is put in and before same fuses tin and cadmium are added. Meanwhile the heat gradually rises and the mass fuses. When fused the mass is stirred with a well dried pine wood rod to obtain a homogeneous composition. After stirring a flux, such as borax, is added to prevent surface oxidation. The melted mixture is cast into rods or bars in mold sand.

Graphite, the material of the crucible employed in the process of making the novel aluminum solder can not impart any impurities to the composition because it consists of carbon which has a rather deoxidizing effect. The well dried pine rod used for stirring consists of organic substance which forms carbon when in contact with the melted mixture and therefore also has a deoxidizing effect. Iron crucibles and stirring rods heretofore used tend to impart impurities to the resulting composition. Thus a pure alloy is obtained which, when used as an aluminum solder does not produce any bad spots in the soldered joints.

The proportions of the components of the new aluminum solder are substantially as follows: For 100 parts of solder I use in the above described order substantially 10.8 % of aluminum,
    2.75% of magnesium,
    85.1 % of tin, and
    1.35% of cadmium
    ———
    100.00

The solder of the above composition answers all practical purposes. For rather expensive articles, however, the cadmium may be replaced by a like percentage of platinum, that is 1.35% of platinum may be used in place of cadmium. This solder is preferable but the cost of producing it is somewhat increased by the presence of the rather expensive platinum.

The metals employed in the manufacture of the novel solder must be pure but particularly the tin must be as pure as possible.

I claim as my invention:

1. As a novel composition of matter an aluminum solder composed essentially of aluminum, magnesium, tin, and cadmium.

2. As a novel composition of matter an aluminum solder composed substantially of 10.8 per cent. of aluminum, 2.75 per cent. of magnesium, 85.1 per cent. of tin, and 1.35 per cent. of cadmium.

3. The process of producing an aluminum solder consisting in heating a carbon crucible to a temperature below the fusion point of aluminum, introducing aluminum, then magnesium, and before same fuses tin and cadmium, and stirring the mass when fused.

4. The process of producing an aluminum solder consisting in heating a graphite crucible to about a temperature of 650° C., introducing aluminum, then magnesium, then pure tin and cadmium, increasing the temperature until the mass is melted, and stirring it to obtain a homogeneous composition.

5. The process of producing an aluminum solder consisting in heating a graphite crucible to about a temperature of 650° C., introducing aluminum, then magnesium, then pure tin and cadmium, increasing the temperature until the mass fuses, stirring same, and adding a flux.

Signed at New York, N. Y., this 8th day of November, 1909.

JOSEPH SILVER.

Witnesses:
 LUDWIG K. BÖHM,
 CORINNE MYERS.